(12) United States Patent
Haag et al.

(10) Patent No.: US 8,201,655 B1
(45) Date of Patent: Jun. 19, 2012

(54) GAS PEDAL LOCKING ASSEMBLY

(76) Inventors: Herbert J. Haag, Columbus, GA (US);
James Delrosario, Columbus, GA (US)

( * ) Notice: Subject to any disclaimer, the term of this patent is extended or adjusted under 35 U.S.C. 154(b) by 83 days.

(21) Appl. No.: 12/793,777

(22) Filed: Jun. 4, 2010

(51) Int. Cl.
*B60R 25/00* (2006.01)
(52) U.S. Cl. ..................................... 180/287; 340/426.1
(58) Field of Classification Search .................. 180/287; 70/192, 195, 202, 237; 74/529; 340/426.1, 340/426.11, 426.36
See application file for complete search history.

(56) References Cited

U.S. PATENT DOCUMENTS

| | | | | |
|---|---|---|---|---|
| 2,931,207 A | * | 4/1960 | Fisher | 70/181 |
| 2,933,916 A | * | 4/1960 | Dean | 70/192 |
| 3,552,518 A | * | 1/1971 | Aidner et al. | 180/287 |
| D312,200 S | | 11/1990 | Bhagwat | |
| 5,079,435 A | * | 1/1992 | Tanaka | 307/10.2 |
| D347,398 S | | 5/1994 | Hodge | |
| 5,359,868 A | | 11/1994 | Villani | |
| 5,396,216 A | * | 3/1995 | Morgan | 340/426.29 |
| 5,482,136 A | | 1/1996 | Sorkin | |
| 5,520,033 A | * | 5/1996 | Holmberg et al. | 70/202 |
| 5,585,779 A | * | 12/1996 | Halikias | 340/426.12 |
| 5,586,457 A | * | 12/1996 | Keener | 70/201 |
| 5,835,868 A | | 11/1998 | McElroy et al. | |
| 5,842,364 A | * | 12/1998 | Oliver | 70/202 |
| 6,390,222 B1 | * | 5/2002 | Cornelius | 180/287 |
| 6,499,324 B2 | | 12/2002 | Reeb et al. | |
| 6,681,904 B1 | * | 1/2004 | Hosford et al. | 188/265 |
| 6,758,071 B1 | * | 7/2004 | Reeb et al. | 70/201 |
| 6,881,904 B2 | * | 4/2005 | Millas et al. | 174/124 R |
| 6,891,101 B2 | | 5/2005 | Riach, Jr. | |
| 7,204,109 B1 | | 4/2007 | De Lucia | |
| 2002/0170762 A1 | | 11/2002 | Daneshmand | |
| 2004/0156327 A1 | * | 8/2004 | Yankielun et al. | 370/310 |
| 2009/0158790 A1 | * | 6/2009 | Oliver | 70/202 |

FOREIGN PATENT DOCUMENTS

| | | | | |
|---|---|---|---|---|
| CA | 2142500 A | * | 4/1996 | |
| GB | 2369812 A | * | 6/2002 | |
| WO | WO 9009912 A1 | * | 9/1990 | |

* cited by examiner

*Primary Examiner* — Joseph Rocca

(57) ABSTRACT

A gas pedal locking assembly for immobilizing the gas pedal of a vehicle to prevent theft includes a pedal arm having a first portion and a second portion. A pedal is coupled to the first portion. A protrusion extends from the pedal arm and has a pivot aperture extending therethrough. A fixed pivot pin extends through the pivot aperture. A locking mechanism is provided for holding the second portion of the pedal arm in a static position to prevent pivoting of the pedal arm.

10 Claims, 5 Drawing Sheets

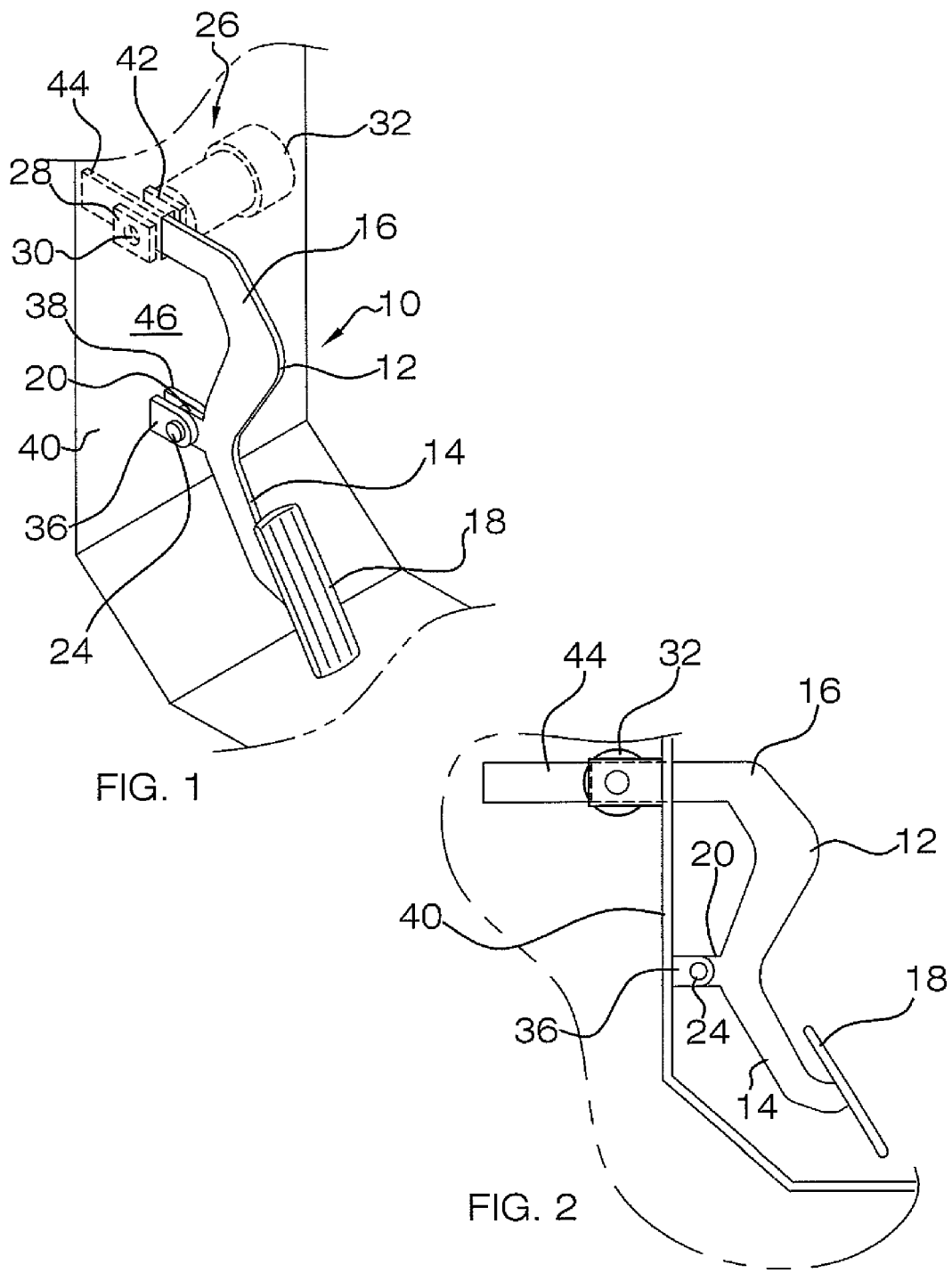

GAS PEDAL LOCKING ASSEMBLY

BACKGROUND OF THE DISCLOSURE

1. Field of the Disclosure

The disclosure relates to vehicle anti-theft devices and more particularly pertains to a new vehicle anti-theft device for immobilizing the gas pedal of a vehicle to prevent theft.

2. Summary of the Disclosure

An embodiment of the disclosure meets the needs presented above by generally comprising a pedal arm having a first portion and a second portion. A pedal is coupled to the first portion. A protrusion extends from the pedal arm and has a pivot aperture extending therethrough. A fixed pivot pin extends through the pivot aperture. A locking mechanism is provided for holding the second portion of the pedal arm in a static position to prevent pivoting of the pedal arm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a gas pedal locking assembly according to an embodiment of the disclosure.

FIG. 2 is a side view of an embodiment of the disclosure.

DESCRIPTION OF THE PREFERRED EMBODIMENT

Figure 3:
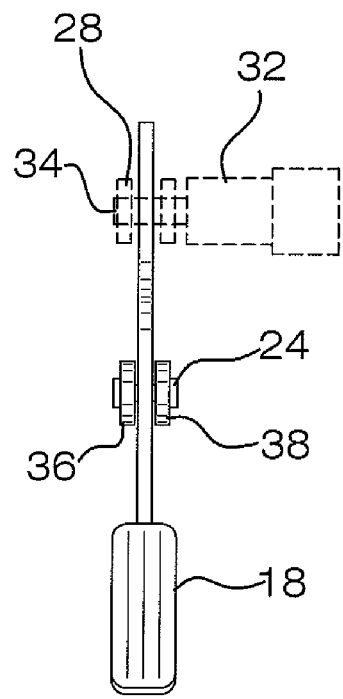
FIG. 3 is a front view of an embodiment of the disclosure.
Figure 4:
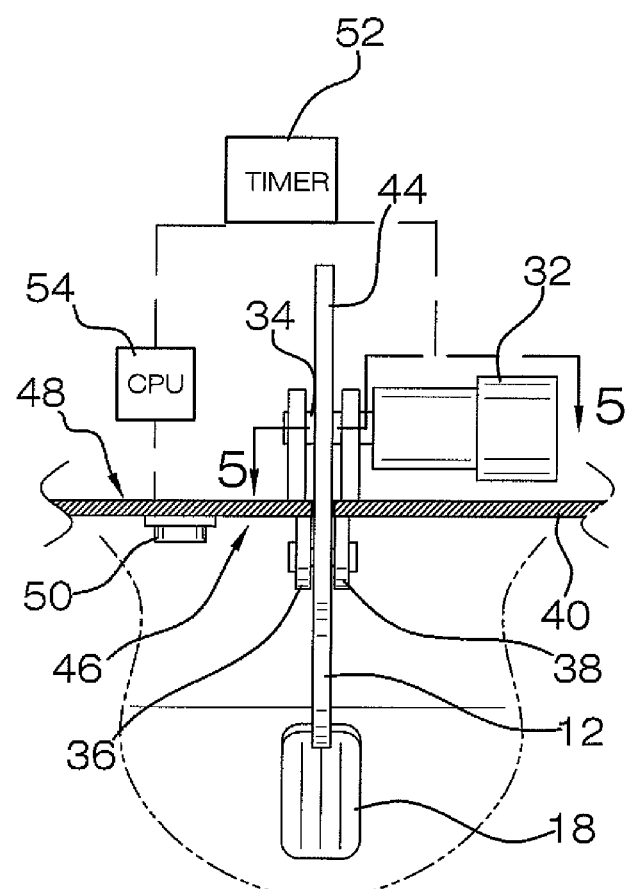
FIG. 4 is a top view of an embodiment of the disclosure.
Figure 5A:
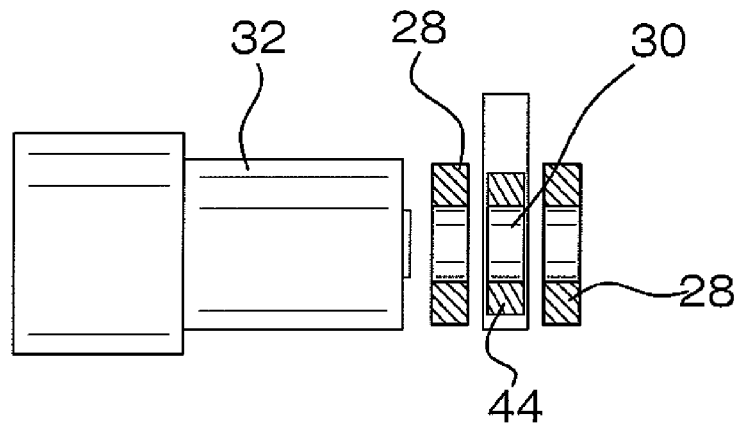
FIG. 5a is a top view of an embodiment of the disclosure in an unlocked state.
Figure 5B:
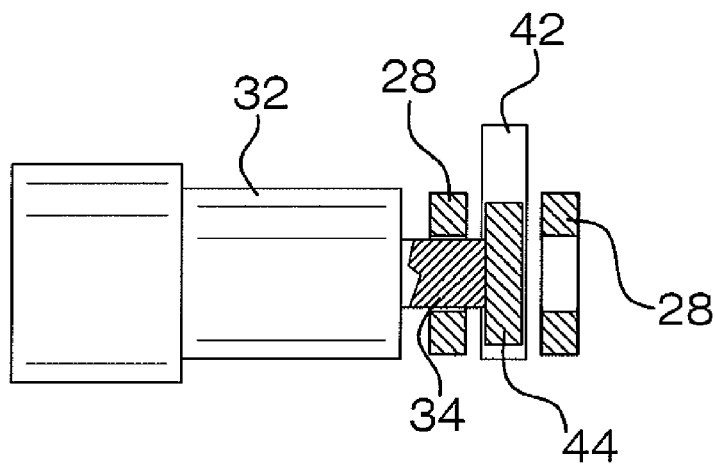
FIG. 5b is a top view of an embodiment of the disclosure in an unlocked state.
Figure 5C:
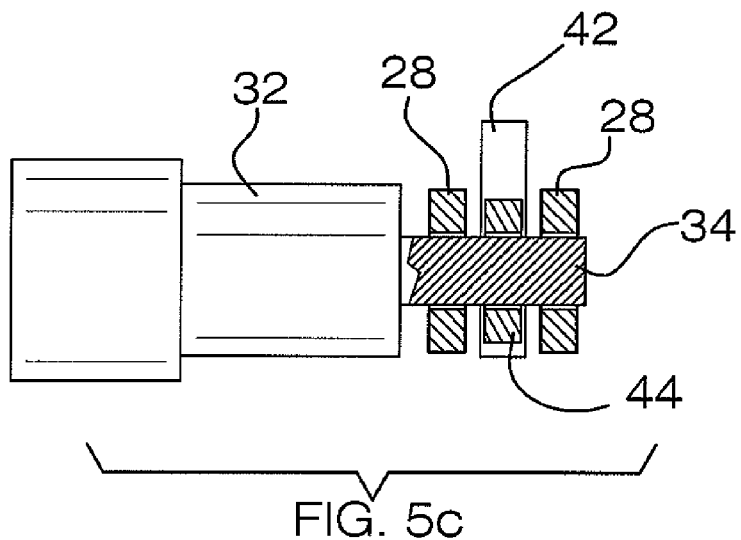
FIG. 5c is a top view of an embodiment of the disclosure in a locked state.
Figure 6:
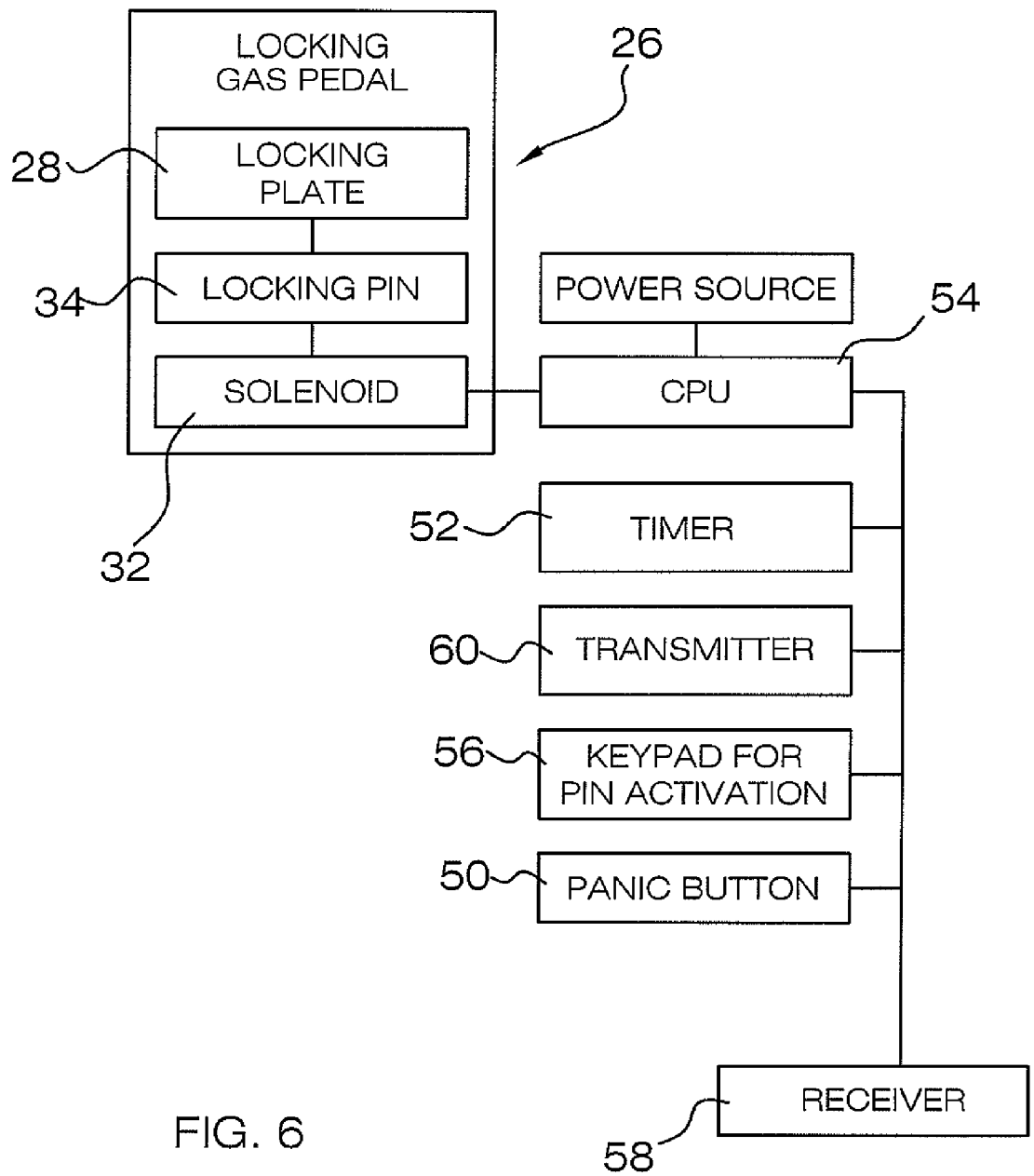
FIG. 6 is a diagram view of an embodiment of the disclosure.
Figure 7:
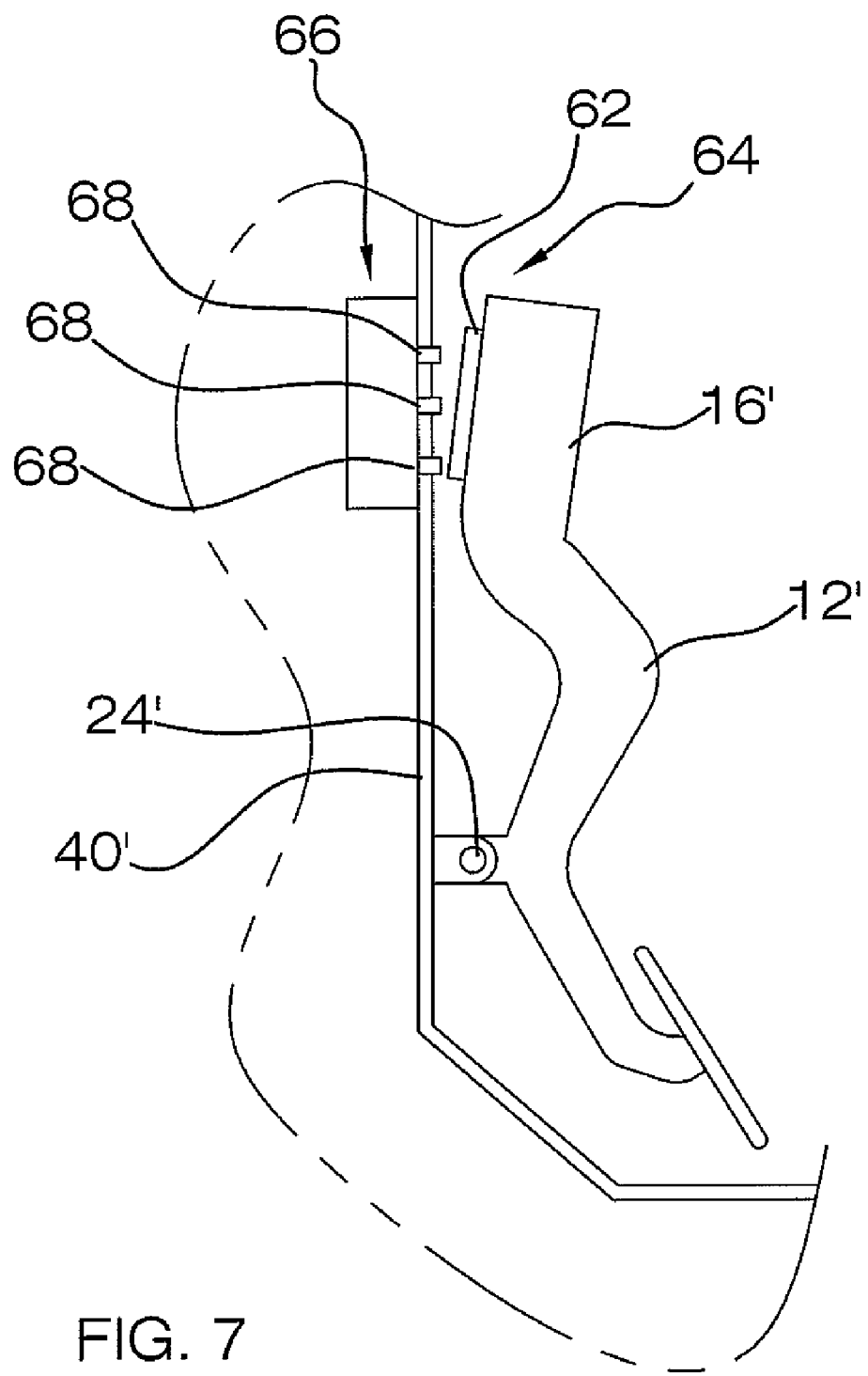
FIG. 7 is a side view of an alternate embodiment of the disclosure.

With reference now to the drawings, and in particular to FIGS. 1 through 7 thereof, a new vehicle anti-theft device embodying the principles and concepts of an embodiment of the disclosure and generally designated by the reference numeral 10 will be described.

As best illustrated in FIGS. 1 through 7, the gas pedal locking assembly 10 generally comprises a pedal arm 12 having a first portion 14 and a second portion 16. A pedal 18 is coupled to the first portion 14. A protrusion 20 extends from the pedal arm 12 and has a pivot aperture 22 extending therethrough. A fixed pivot pin 24 extends through the pivot aperture 22. A locking mechanism 26 is provided for holding the second portion 16 of the pedal arm 12 in a static position to prevent pivoting of the pedal arm 12.

In an embodiment, the locking mechanism 26 is formed by the second portion 16 of the pedal arm 12 extending adjacent to a fixed locking plate 28. The second portion 16 of the pedal arm 12 has a locking aperture 30 positionable adjacent to the fixed locking plate 28 when the pedal arm 12 is in an unpivoted position. A solenoid 32 has an extendable locking pin 34 that is extendable through the locking aperture 30 and the fixed locking plate 28. Thus, the pedal arm 12 is prevented from pivoting about the fixed pivot pin 24 extending through the pivot aperture 22.

A pair of fixed plates 36,38 extend from a firewall 40. The pivot pin 24 extends through the fixed plates 36,38. A slot 42 is positioned in the firewall 40. A distal end 44 of the second portion 16 relative to the protrusion 20 extends through the slot 42. The pivot plates 36,38 extend from a first face 46 of the firewall 40. The solenoid 32 and the locking plate 28 extend from a second face 48 of the firewall 40.

A button 50 positioned on the firewall 40 proximate the pedal arm 12 is operationally coupled to the solenoid 32 such that the solenoid 32 extends the locking pin 34 upon depression of the button 50. A timer 52 is operationally coupled to the button 50 and the solenoid 32 such that the solenoid 32 extends the locking pin 34 a pre-determined time after the button 50 is depressed.

A processor 54 is operationally coupled to the solenoid 32. An input device 56 such as a keyboard, retinal scanner, thumbprint reader, or the like is operationally coupled to the processor 54 such that the processor 54 permits retraction of the locking pin 34 only upon entering pre-determined input data into the input device 56. A receiver 58 is operationally coupled to the processor 54. A transmitter 60 such as a key fob is provided for transmitting an alarm signal to the receiver 58 such that the processor 54 extends the locking pin 34.

In an alternate embodiment, the locking mechanism 26 comprises a metal plate 62 coupled to an end 64 of the second portion 16' of the pedal arm 12'. The fixed pivot pin 24' is coupled to the firewall 40'. A magnetic lock mechanism 66 is coupled to the firewall 40' for selectively magnetically engaging the metal plate 62 to prevent pivoting of the pedal arm 12'. The magnetic lock mechanism 66 includes a plurality of bars 68 extending through the firewall 40' to contact and engage the metal plate 62 when the magnetic lock mechanism 66 is activated. The alternate embodiment includes similar structure and function to the first embodiment as described above in all other respects.

In use, a vehicle is disabled to prevent theft by locking the pedal arm 12 into a static position. This is achieved by activating the locking mechanism 26 to either extend the locking pin 34 from the solenoid 32 to engage fixed plates 36,38, or activating magnetic locking mechanism 66 to magnetically hold metal plate 62 in contact with bars 68. The locking mechanism 26 is activated remotely using transmitter 60 or by manipulation of button 50. Button 50 may be positioned on the firewall 40 of the vehicle and operationally coupled to processor 54 to delay activation of the locking mechanism 26 providing a user an opportunity to escape the vehicle prior to the vehicle being disabled in the event the vehicle is hijacked.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A gas pedal locking assembly comprising:
a pedal arm having a first portion and a second portion;
a pedal coupled to said first portion;
a protrusion extending from said pedal arm, said protrusion having a pivot aperture extending therethrough;
a fixed pivot pin extending through said pivot aperture;
a locking mechanism for holding said second portion of said pedal arm in a static position to prevent pivoting of said pedal arm;
wherein said locking mechanism includes;
    said second portion of said pedal arm extending adjacent to a fixed locking plate, said second portion of said pedal arm having a locking aperture positionable adjacent to said fixed locking plate; and
    a solenoid having an extendable locking pin, said locking pin being extendable through said locking aperture and said fixed locking plate whereby said pedal arm is prevented from pivoting about said fixed pivot pin extending through said pivot aperture;
a firewall, a slot positioned in said firewall, a distal end of said second portion relative to said protrusion extending through said slot; and
a pair of fixed plates extending from said firewall, said pivot pin extending through said fixed plates.

2. The gas pedal locking assembly of claim 1, wherein said fixed plates extend from a first face of said firewall.

3. The gas pedal locking assembly of claim 2, wherein said solenoid and said locking plate extend from a second face of said firewall.

4. The gas pedal locking assembly of claim 1, further including a button operationally coupled to said solenoid such that said solenoid extends said locking pin upon depression of said button.

5. The gas pedal locking assembly of claim 4, further including a timer operationally coupled to said button and said solenoid such that said solenoid extends said locking pin a pre-determined time after said button is depressed.

6. The gas pedal locking assembly of claim 1, further comprising:
a processor operationally coupled to said solenoid; and
an input device operationally coupled to said processor such that said processor permits retraction of said locking pin only upon entering pre-determined input data into said input device.

7. The gas pedal locking assembly of claim 1, further comprising:
a processor operationally coupled to said solenoid;
a receiver operationally coupled to said processor; and
a transmitter for transmitting an alarm signal to said receiver such that said processor extends said locking pin.

8. A gas pedal locking assembly comprising:
a pedal arm having a first portion and a second portion;
a pedal coupled to said first portion;
a protrusion extending from said pedal arm, said protrusion having a pivot aperture extending therethrough;
a fixed pivot pin extending through said pivot aperture;
said second portion of said pedal arm extending adjacent to a fixed locking plate, said second portion of said pedal arm having a locking aperture positionable adjacent to said fixed locking plate;
a solenoid having an extendable locking pin, said locking pin being extendable through said locking aperture and said fixed locking plate whereby said pedal arm is prevented from pivoting about said fixed pivot pin extending through said pivot aperture;
a firewall;
a pair of fixed plates extending from said firewall, said pivot pin extending through said fixed plates;
a slot positioned in said firewall, a distal end of said second portion relative to said protrusion extending through said slot;
wherein said fixed plates extend from a first face of said firewall;
wherein said solenoid and said locking plate extend from a second face of said firewall;
a button operationally coupled to said solenoid such that said solenoid extends said locking pin upon depression of said button;
a timer operationally coupled to said button and said solenoid such that said solenoid extends said locking pin a pre-determined time after said button is depressed;
a processor operationally coupled to said solenoid;
an input device operationally coupled to said processor such that said processor permits retraction of said locking pin only upon entering pre-determined input data into said input device;
a receiver operationally coupled to said processor; and
a transmitter for transmitting an alarm signal to said receiver such that said processor extends said locking pin.

9. A gas pedal locking assembly comprising:
a pedal arm having a first portion and a second portion;
a pedal coupled to said first portion;
a protrusion extending from said pedal arm, said protrusion having a pivot aperture extending therethrough;
a fixed pivot pin extending through said pivot aperture; and
a locking mechanism for holding said second portion of said pedal arm in a static position to prevent pivoting of said pedal arm, said locking mechanism further comprising;
    a metal plate coupled to an end of said second portion of said pedal arm;
    a firewall, said fixed pivot being coupled to said firewall; and
    a magnetic lock mechanism coupled to said firewall for selectively magnetically engaging said metal plate to prevent pivoting of said pedal arm.

10. The gas pedal locking assembly of claim 9, said magnetic lock mechanism including a plurality of bars extending through said firewall to contact and engage said metal plate when said magnetic lock mechanism is activated.

* * * * *